United States Patent
Yi et al.

(10) Patent No.: US 8,379,984 B2
(45) Date of Patent: Feb. 19, 2013

(54) METHOD OF CONTROLLING DIGITAL IMAGE PROCESSING APPARATUS FOR FACE DETECTION, AND DIGITAL IMAGE PROCESSING APPARATUS EMPLOYING THE METHOD

(75) Inventors: Dong Yi, Changwon (KR); Young-soo Bok, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 12/228,468

(22) Filed: Aug. 13, 2008

(65) Prior Publication Data

US 2009/0097707 A1   Apr. 16, 2009

(30) Foreign Application Priority Data

Oct. 12, 2007   (KR) ........................ 10-2007-0103177

(51) Int. Cl.
   *G06K 9/46* (2006.01)
(52) U.S. Cl. ...................................................... 382/190
(58) Field of Classification Search .......... 382/100–107, 382/115–118; 351/204–206; 348/169–172; 342/118–122, 147–152
   See application file for complete search history.

(56) References Cited

U.S. PATENT DOCUMENTS

| | | | | |
|---|---|---|---|---|
| 2004/0264741 | A1* | 12/2004 | Omatsu et al. | 382/115 |
| 2007/0013791 | A1* | 1/2007 | Kinoshita et al. | 348/239 |
| 2007/0165967 | A1* | 7/2007 | Ando et al. | 382/291 |
| 2007/0258646 | A1 | 11/2007 | Sung et al. | |

FOREIGN PATENT DOCUMENTS

| | | |
|---|---|---|
| CN | 1573795 A | 2/2005 |
| CN | 1892702 A | 1/2007 |
| CN | 1963839 A | 5/2007 |
| JP | 2001-051338 A | 2/2001 |
| KR | 1020030039664 A | 5/2003 |
| KR | 1020030077796 A | 10/2003 |
| KR | 1020060121503 A | 11/2006 |

OTHER PUBLICATIONS

Rafael C. Gonzalez, Richard E. Woods, Digital Image Processing, Prentice Hall, Second Edition, 2002, ISBN: 0-201-18075-8, p. 210.*
Hong et al., "Multi View Face Detection and Pose Discrimination in Video," Journal of Computer Aided Design & Computer Graphics, vol. 19 (1), pp. 90-92 (Jan. 2007).
Office Action established for CN 200810213133.1 (Feb. 2, 2012).
Office Action established for CN 200810213133.1 (Aug. 7, 2012).

* cited by examiner

*Primary Examiner* — Atiba O Fitzpatrick
(74) *Attorney, Agent, or Firm* — Drinker Biddle & Reath LLP

(57) ABSTRACT

Provided is a method of controlling a digital image processing apparatus for detecting a face from continuously input images, the method comprising operations (a) to (c). In (a), if a face is detected, image information of a body area is stored. In (b), if the face is not detected, a body having the image information stored in (a) is detected. In (c), if a current body is detected after a previous body was detected in (b), an image characteristic of the previously detected body is compared to an image characteristic of the currently detected body, and a movement state of the face is determined according to the comparison result.

8 Claims, 6 Drawing Sheets

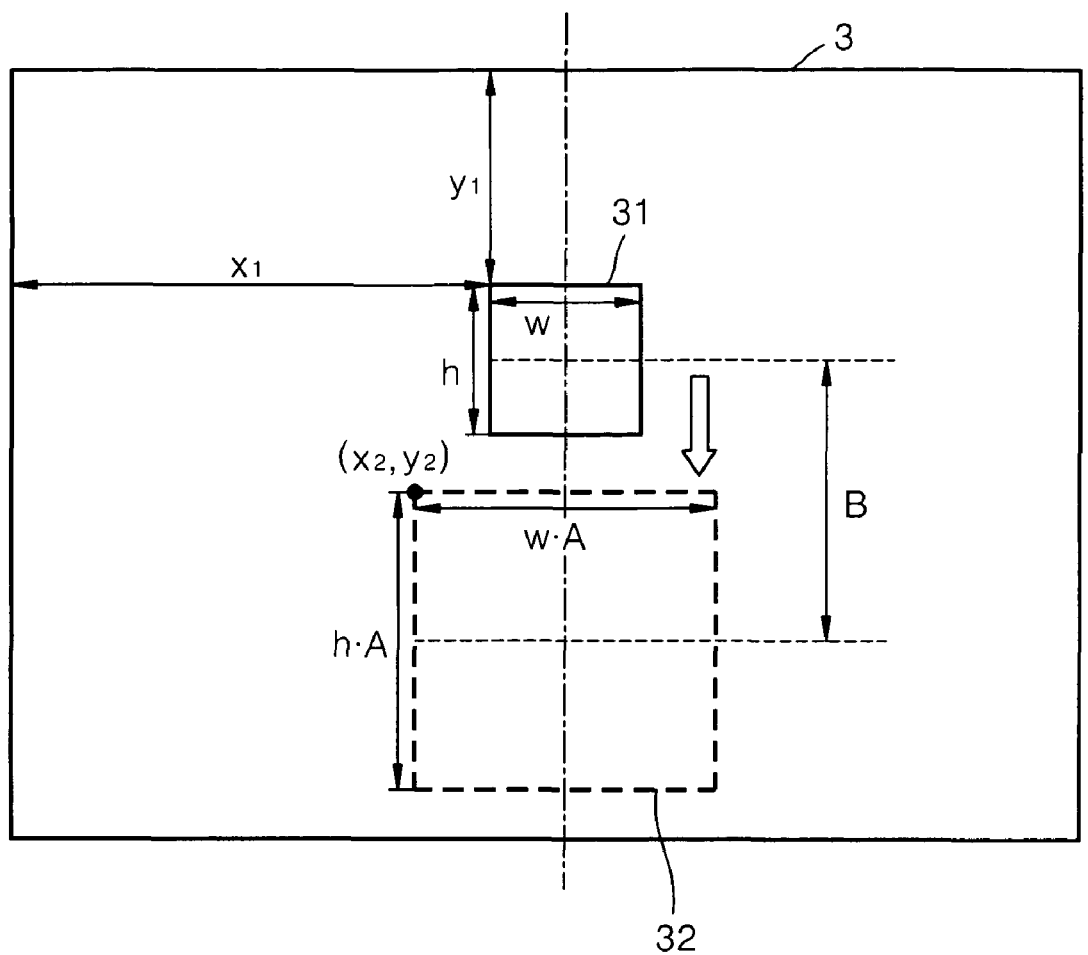

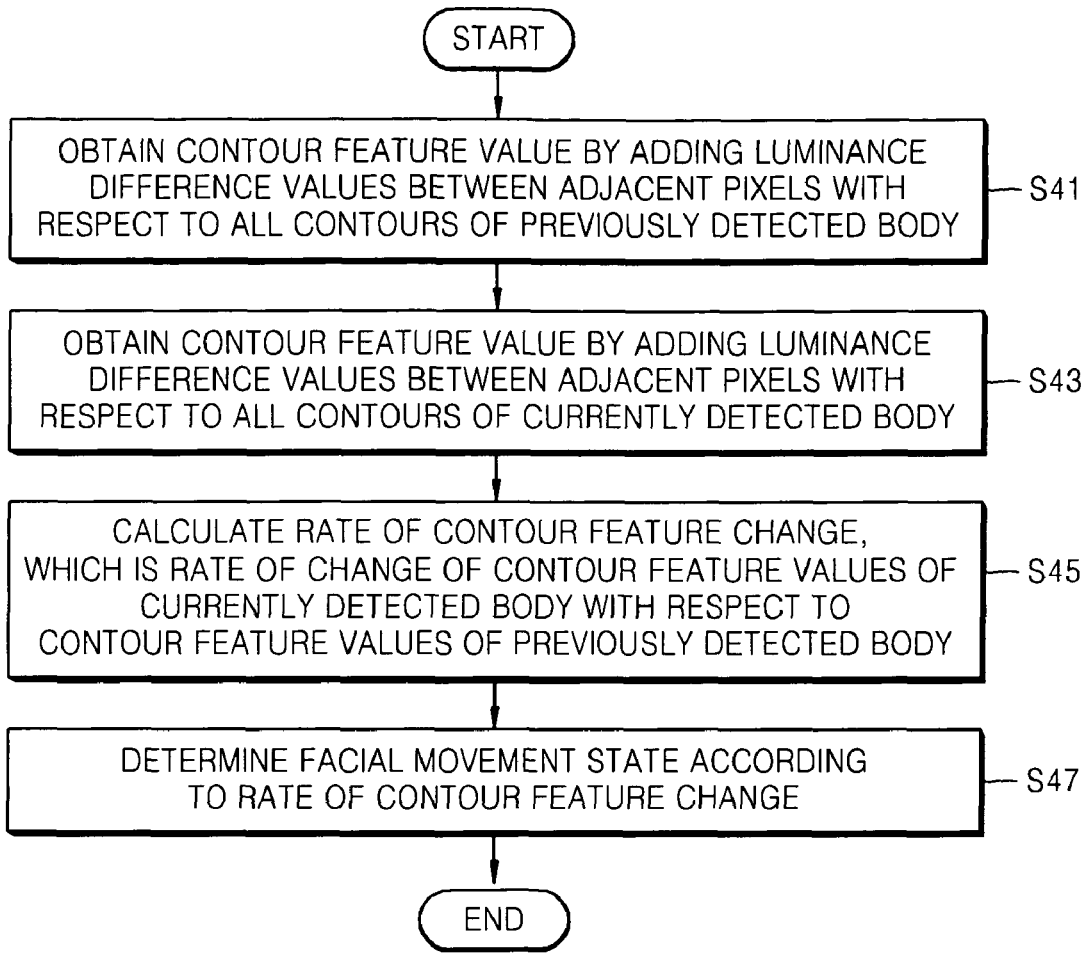
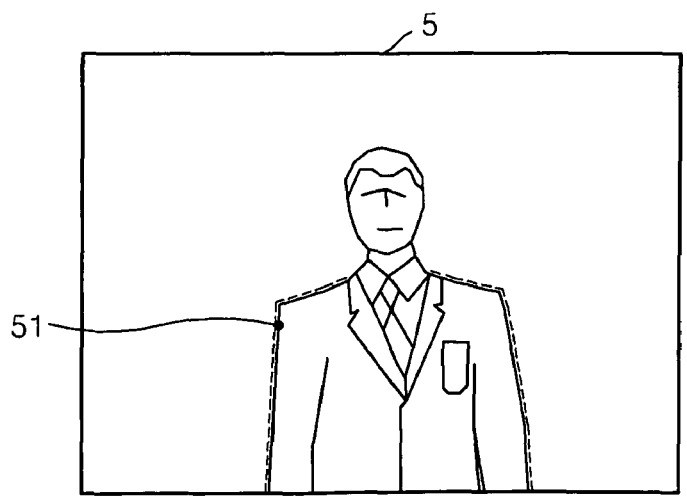

METHOD OF CONTROLLING DIGITAL IMAGE PROCESSING APPARATUS FOR FACE DETECTION, AND DIGITAL IMAGE PROCESSING APPARATUS EMPLOYING THE METHOD

CROSS-REFERENCE TO RELATED PATENT APPLICATION

This application claims the benefit of Korean Patent Application No. 10-2007-0103177, filed on Oct. 12, 2007, in the Korean Intellectual Property Office, the entire contents of which is incorporated herein by reference.

BACKGROUND OF THE INVENTION

1. Field of the Invention

The present invention relates to a method of controlling a digital image processing apparatus, and a digital image processing apparatus employing the method, and more particularly, to a method of controlling a digital image processing apparatus for detecting a face from continuously input images and a digital image processing apparatus employing the method.

2. Description of the Related Art

Conventional digital image processing apparatuses have a function of detecting a face from continuously input images.

This face detection function is widely used in digital cameras, security surveillance devices, robots moving in response to a facial movement, and automatic devices.

An example of a digital image processing apparatus is a digital camera that detects a face in a live-view mode and sets a region of the detected face as an automatic focusing area.

The face detection function, in most cases, is accomplished by only well known face recognition methods.

Various face recognition technologies are disclosed as face recognition methods. For example, face recognition technology, using geometrical characteristics of a face, recognizes a face of an individual using geometrical factors, such as positions and sizes of facial feature points, such as center of the eyes, tip of the nose, and mouth corners, and distances between the facial feature points. The geometrical characteristics of a face are included in elements finally remaining when a resolution of an input image is decreased.

However, if a face is detected by only using a face recognition method, a face cannot be detected when the face to be recognized is not oriented to a capturing unit.

SUMMARY OF THE INVENTION

The present invention provides a method of controlling a digital image processing apparatus for quickly detecting a face even when the face is not oriented to a capturing unit, and the digital image processing apparatus employing the method.

According to an embodiment of the present invention, there is provided a method of controlling a digital image processing apparatus for detecting a face from continuously input images, the method comprising operations (a) to (c).

In (a), if a face is detected, image information of a body area is stored.

In (b), if the face is not detected, a body having the image information stored in (a) is detected.

In (c), if a current body is detected after a previous body was detected in (b), an image characteristic of the previously detected body is compared to an image characteristic of the currently detected body, and a movement state of the face is determined according to the comparison result.

According to another embodiment of the present invention, there is provided a digital image processing apparatus, which comprises a main controller and detects a face from continuously input images, wherein the main controller operates by employing the method.

According to the method of controlling a digital image processing apparatus, and the digital image processing apparatus employing the method, if a face is not detected, a current direction of the face can be determined using an image characteristic of a body. Thus, even when a face to be recognized is not oriented to a capturing unit, the face can be quickly detected.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram for describing an example of operation S23, illustrated in FIG. 2, (setting a size and reference coordinates of a body according to a size and reference coordinates of a face), according to an embodiment of the present invention;

FIG. 4 is a flowchart illustrating an example of a method of the DCP, illustrated in FIG. 1, of determining a movement state of a face when a current body is detected after a previous body is detected (i.e., a current body is detected since the mean gradation data of a body area of the current body is stored) according to operation S26 illustrated in FIG. 2 (detecting a body having the stored mean red, green, and blue gradations), according to an embodiment of the present invention;

FIG. 5 is a diagram illustrating an example of a body contour corresponding to the face, according to an embodiment of the present invention;

DETAILED DESCRIPTION OF THE INVENTION

Exemplary embodiments of the present invention will now be described in detail with reference to the attached drawings.

Figure 1:
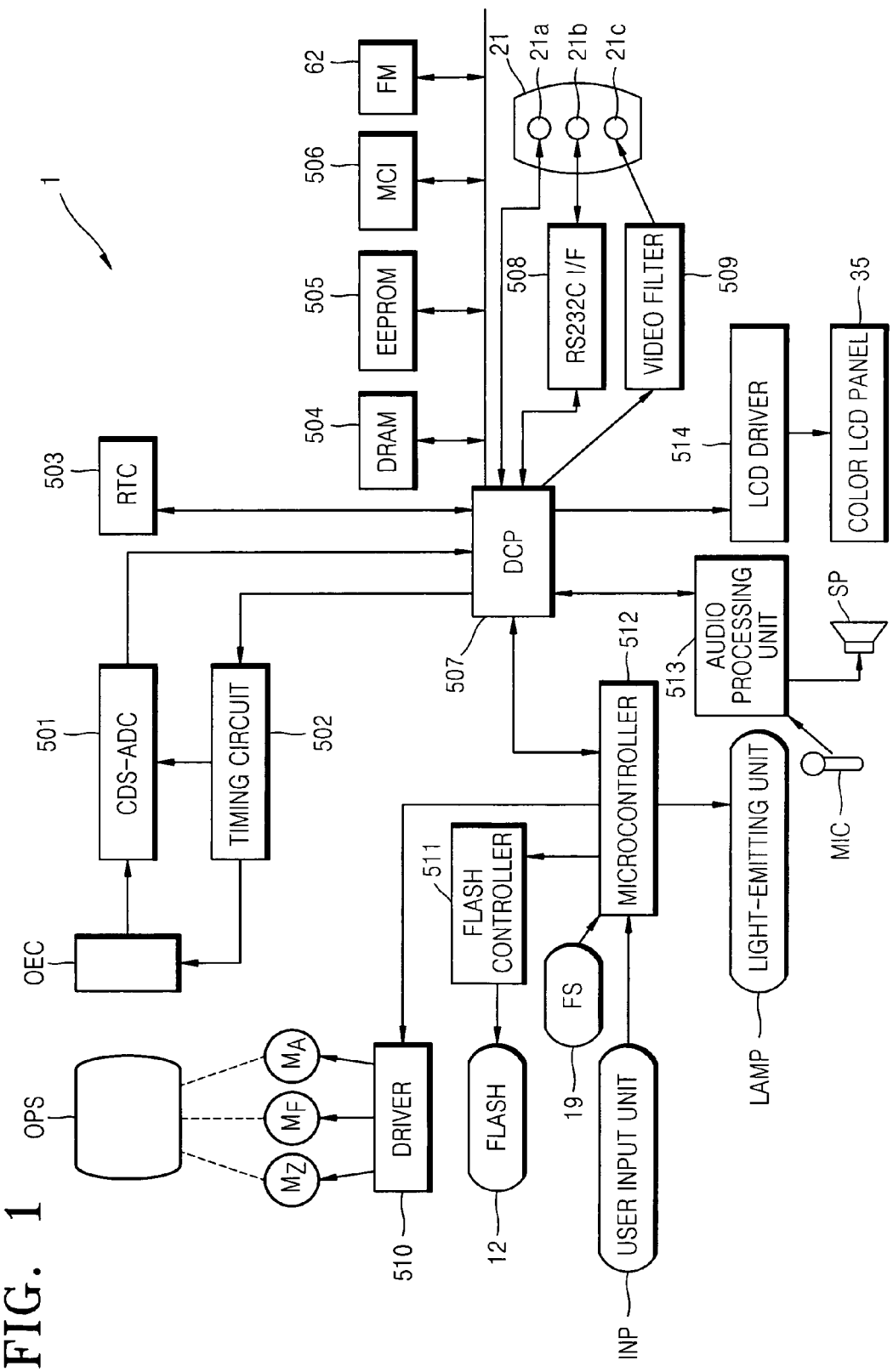
FIG. 1 is a configuration of an example of a digital camera as a digital image processing apparatus employing a control method, according to an embodiment of the present invention.

FIG. 1 is a configuration of an example of a digital camera 1 as a digital image processing apparatus employing a control method, according to an embodiment of the present invention.

Referring to FIG. 1, an optical position sensor (OPS) including a lens module and a filter module optically processes light from a subject to be photographed. The lens module of the OPS includes a zoom lens, a focus lens, and a compensation lens. If a zooming signal is input to a microcontroller 512 via a user input unit INP in a live-view mode or a moving picture capturing mode, the microcontroller 512 controls a driver 510 for moving the zoom lens by driving a zoom motor $M_Z$.

In an auto focusing mode, a main controller included in a digital camera processor (DCP) 507 controls the microcontroller 512 to control the driver 510 for driving a focus motor $M_F$. Accordingly, the focus lens moves, and during this process, a position of the focus lens at which the most high frequency component of an image signal is generated, e.g., the number of driving steps of the focus motor $M_F$ is set. An aperture motor $M_A$ is a motor for driving a compensation lens to control an aperture.

An optoelectronic converter (OEC) including a charge coupled device (CCD) or a complementary metal-oxide semiconductor (CMOS) converts the light input from the OPS to an electrical analog signal. The DCP 507 controls a timing circuit 502 to control the OEC and a correlation double sampler and analog-to-digital converter (CDS-ADC) 501. The CDS-ADC 501 processes the electrical analog signal input from the OEC, cancels high frequency noise from the electrical analog signal, adjusts an amplitude of the electrical analog signal, and generates digital image data.

A real-time clock (RTC) 503 provides time information to the DCP 507. The DCP 507 generates digital image data classified into luminance and chromaticity signals by processing the digital image data input from the CDS-ADC 501.

A light-emitting unit LAMP driven by the microcontroller 512 according to control signals output from the main controller equipped DCP 507 includes a self-timer lamp and a camera-state lamp.

The user input unit INP includes a shutter release button, function buttons, a power button, a zoom button, and a mode button.

The digital image data generated by the DCP 507 is temporarily stored in a dynamic random access memory (DRAM) 504, for example. An algorithm required to operate the DCP 507 is stored in an electrically erasable and programmable read only memory (EEPROM) 505, for example. A user memory card is inserted into and discharged from a memory card interface (MCI) 506, for example. Setting data required to operate the DCP 507 is stored in a flash memory (FM) 62, for example. A plurality of memory cards as user recording media can be sequentially inserted into and discharged from the MCI 506, for example.

The digital image data generated by the DCP 507 is input to a liquid crystal display (LCD) driver 514, and thereby an image is displayed on a color LCD panel 35, for example.

In an interface unit 21, the digital image data generated by the DCP 507 can be transmitted in serial communication via a universal serial bus connector 21a or an RS232C interface 508 and an RS232C connector 21b, or can be transmitted as a video signal via a video filter 509 and a video output port 21c, for example.

An audio processing unit 513 outputs an audio signal input from a microphone MIC to the DCP 507 or a speaker SP, or outputs an audio signal input from the DCP 507 to the speaker SP.

The microcontroller 512 drives a flash 12 by controlling a flash controller 511 according to a signal input from a flash and light intensity sensor 19.

Figure 2:
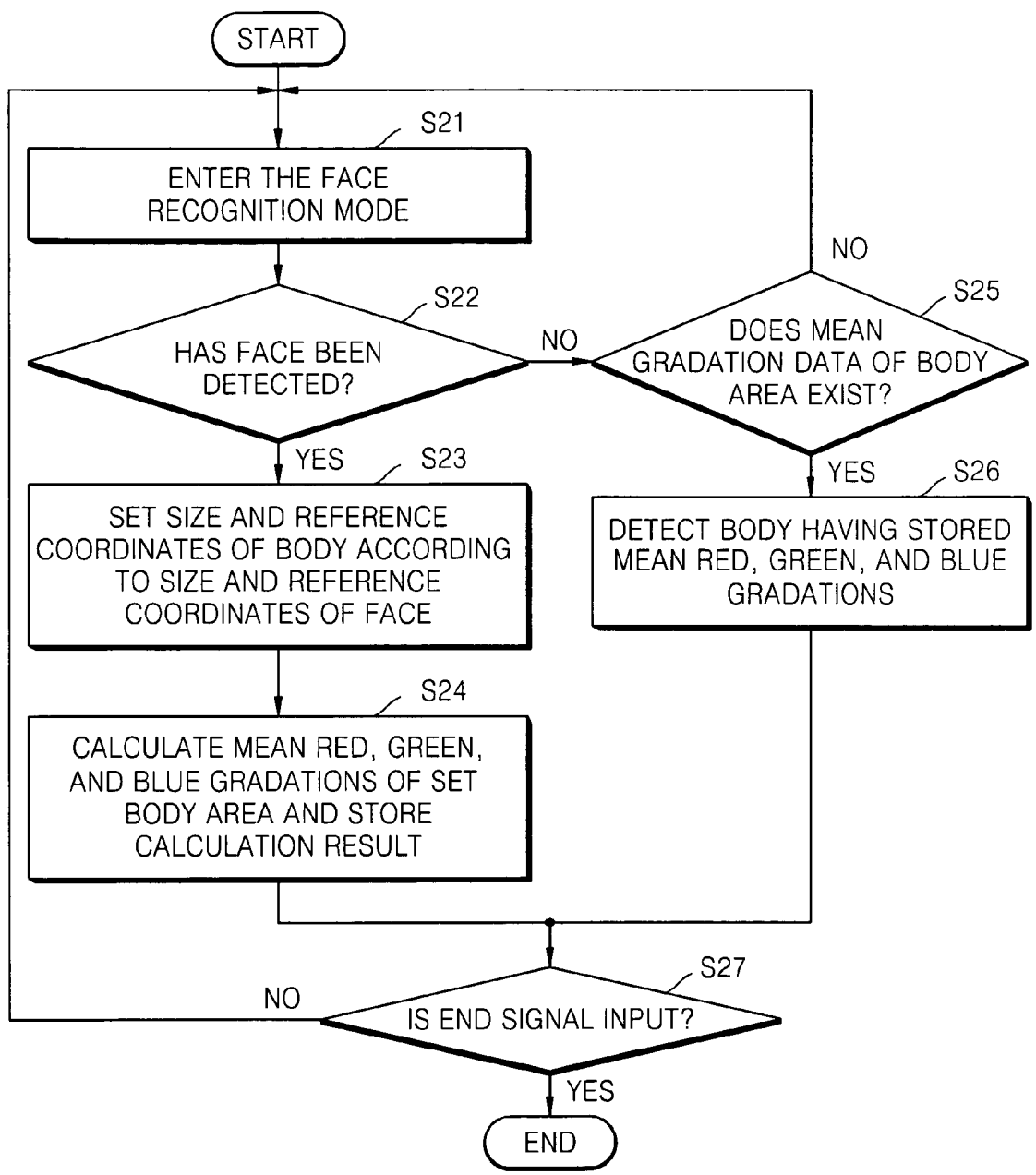
FIG. 2 is a flowchart illustrating an example of a face recognition method of a digital camera processor (DCP), illustrated in FIG. 1, in a face detection mode, according to an embodiment of the present invention.

FIG. 2 is a flowchart illustrating an example of a face recognition method of the DCP 507, illustrated in FIG. 1, in a face detection mode, according to an embodiment of the present invention.

Referring to FIG. 2, the DCP 507 detects whether or not a face is detected in the face recognition mode, in operation S21. As described above, various face recognition technologies are disclosed as face recognition methods. In the example of the current embodiment, a face recognition technology using geometrical characteristics of a face is used. That is, individual faces are recognized using geometrical factors, such as positions and sizes of facial feature points, such as center of the eyes, tip of the nose, and mouth corners, and distances between the facial feature points. The geometrical characteristics are included in elements finally remaining when a resolution of an input image is decreased.

In operation S22, the DCP 507 determines whether a face is detected in operation S21.

If it is determined in operation S22 that a face is detected, in operation S23, the DCP 507 sets a size and reference coordinates of a body according to a size and reference coordinates of the face. In addition, in operation S24, the DCP 507 calculates a mean red gradation R, a mean green gradation G, and a mean blue gradation B of a set body area and stores the calculation result.

Otherwise, if it is determined in operation S22 that a face is not detected, the DCP 507 determines, in operation S25, whether mean gradation data of a body area is stored.

If it is determined, in operation S25, that mean gradation data of a body area is not stored, the DCP 507 enters into the face recognition mode again, in operation S21.

Otherwise, if it is determined, in operation S25, that mean gradation data of a body area is stored, the DCP 507 detects a body having the stored mean red, green, and blue gradations R, G, and B, in operation S26.

The above-described operations are repeatedly performed, via operation S27, until an external end signal is generated.

In summary, if a face is not detected, a body is detected by using mean gradations of a body, which have been stored when the face was previously detected.

FIG. 3 is a diagram for describing an example of operation S23, illustrated in FIG. 2, (setting a size and reference coordinates of a body according to a size and reference coordinates of a face), according to an embodiment of the present invention. That is, when a face area 31 is set once the face area 31 is found from a face search, a body area 32 is set as described below.

A distance B between the center of the face area 31 and the center of the body area 32 is set. The distance B may be differently set according to a country at which the digital camera 1 is used.

Since a horizontal width w and a vertical width h of the face area 31 are already known, a horizontal width wA of the body area 32 is set by multiplying the horizontal width w of the face area 31 by a magnification A, and a vertical width hA of the body area 32 is set by multiplying the vertical width h of the face area 31 by the magnification A. The magnification A may be differently set according to a country at which the digital camera 1 is used.

Accordingly, reference coordinates $(x_2, y_2)$ of the body area 32 can be set with respect to reference coordinates $(x_1, y_1)$ of the face area 31.

Figure 6:
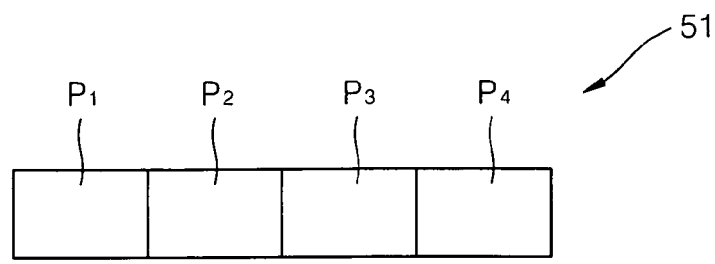
FIG. 6 is a magnified diagram of an example of the contour body illustrated in FIG. 5, according to an embodiment of the present invention.
Figure 7:
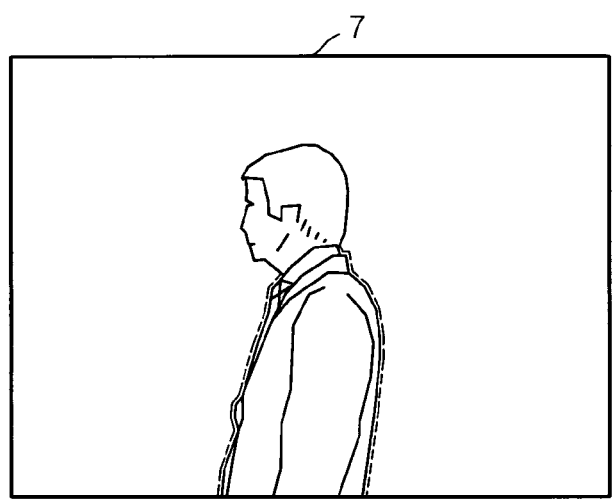
FIG. 7 is a diagram of an example of the body when an object of interest illustrated in FIG. 5 is facing left.
Figure 8:
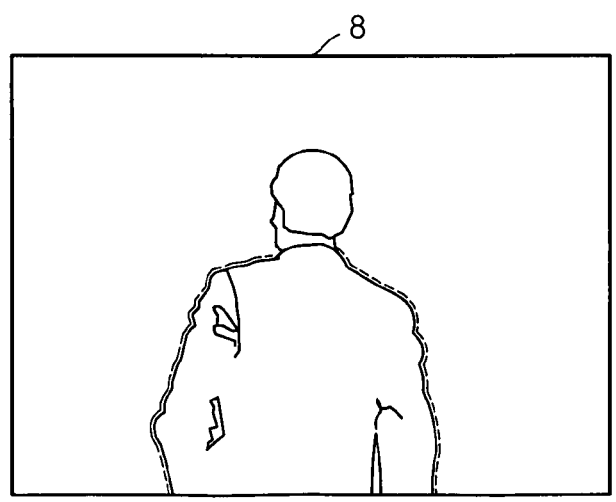
FIG. 8 is a diagram of an example of the body when the object of interest illustrated in FIG. 5 is facing away.

FIG. 4 is a flowchart illustrating an example of a method of the DCP 507 illustrated in FIG. 1 of determining a movement state of a face when a current body is detected after a previous body is detected (i.e., a current body is detected since the mean gradation data of a body area of the current body is stored) according to operation S26 illustrated in FIG. 2 (detecting a body having the stored mean red, green, and blue gradations), according to an embodiment of the present invention. FIG. 5 is a diagram illustrating an example of a body contour 51 corresponding to the face according to an embodiment of the present invention. FIG. 6 is a magnified diagram of an example of the body contour 51 illustrated in FIG. 5, according to an embodiment of the present invention. FIG. 7 is a diagram of an example of the body when the face and the body illustrated in FIG. 5 are turned to be facing left. FIG. 8 is a diagram of an example of the body when the face and the body illustrated in FIG. 5 are turned back to be facing away.

In FIG. 5, if the current body is detected after a previous body is detected (i.e., the current body is detected since the mean gradation data of a body area of the current body is stored) according to operation S26 illustrated in FIG. 2, a luminance characteristic of a contour of the detected previous body is compared to a luminance characteristic of a contour of the detected current body, and thus, the movement state of the face is determined according to the comparison result.

The method of the DCP 507 of determining a movement state of a face when a current body is detected after a previous body is detected will now be described with reference to FIGS. 4 to 8.

The DCP 507 obtains a contour feature value by adding luminance difference values between adjacent pixels with respect to all contours of a previously detected body in operation S41. In the specification, luminance means, for example, luminance (Y) included in image data of the luminance (Y) and chromaticity (Cb and Cr).

For example, if pixels of the body contour 51 are a second pixel $P_2$ and a third pixel $P_3$, a luminance difference value between a first pixel $P_1$ and the second pixel $P_2$, a luminance difference value between the second pixel $P_2$ and the third pixel $P_3$, a luminance difference value between the third pixel $P_3$ and a fourth pixel $P_4$ are added with respect to the body contour 51 (refer to FIG. 6). This calculation is performed for each of all contours, and a result obtained by adding all the added values becomes a contour feature value.

The DCP 507 obtains the contour feature value by adding luminance difference values between adjacent pixels with respect to all contours of a currently detected body in operation S43. A detailed description thereof was described previously in the foregoing discussion.

The DCP 507 calculates a rate of contour feature change, which is a rate of change of the contour feature values of the currently detected body with respect to the contour feature values of the previously detected body, in operation S45.

The DCP 507 determines a facial movement state according to the rate of contour feature change, in operation S47. For example, a case where an object of interest is facing away (in the case of FIG. 8) has a higher contour feature value than a case where the object of interest is facing left (in the case of FIG. 7).

According to operations described above, a current direction of a face can be determined by comparing an image characteristic of a previously detected body and an image characteristic of a currently detected body. Accordingly, even when a face of interest is not oriented to a capturing unit, the face can be quickly detected.

Figure 9:
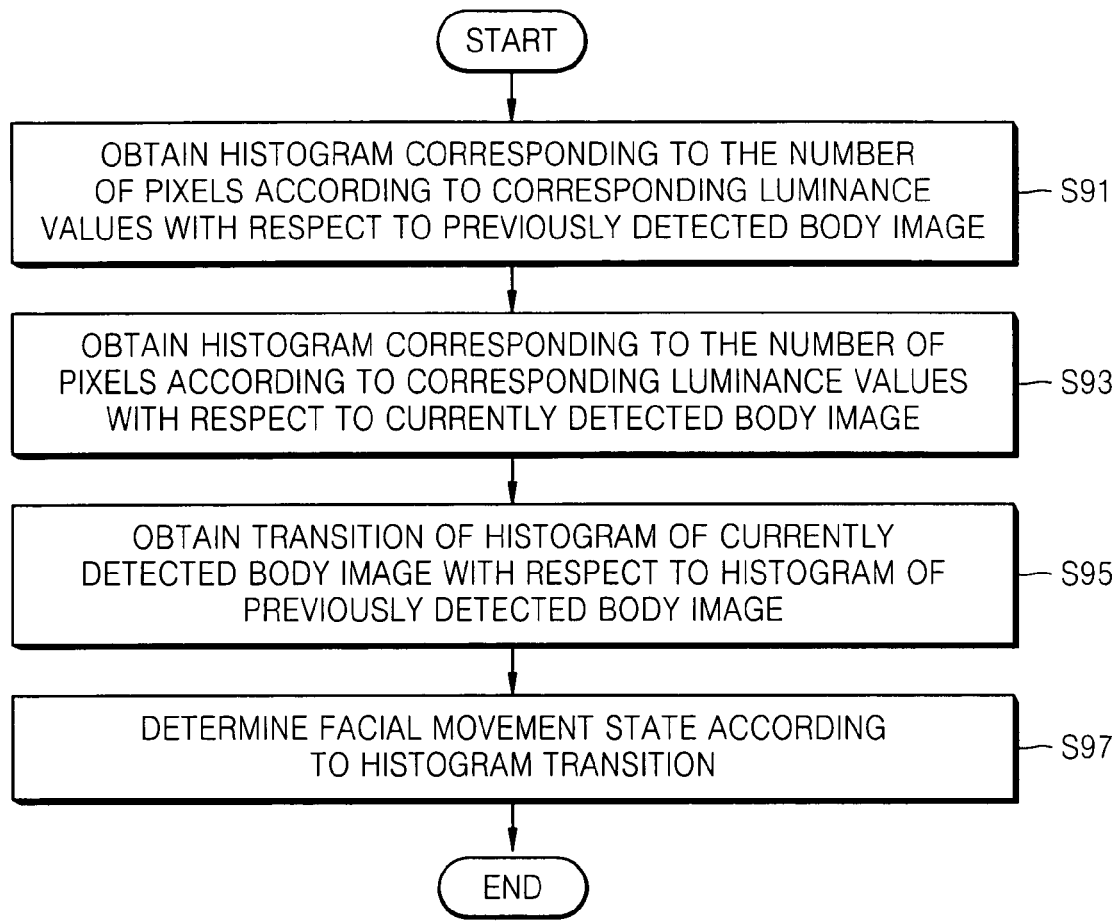
FIG. 9 is a flowchart illustrating an example of a method of the DCP illustrated in FIG. 1 for determining a movement state of a face when a current body is detected after a previous body is detected (i.e., a current body is detected since the mean gradation data of a body area of the current body is stored) according to operation S26 illustrated in FIG. 2 (detecting a body having stored mean red, green, and blue gradations), according to another embodiment of the present invention.
Figure 10:
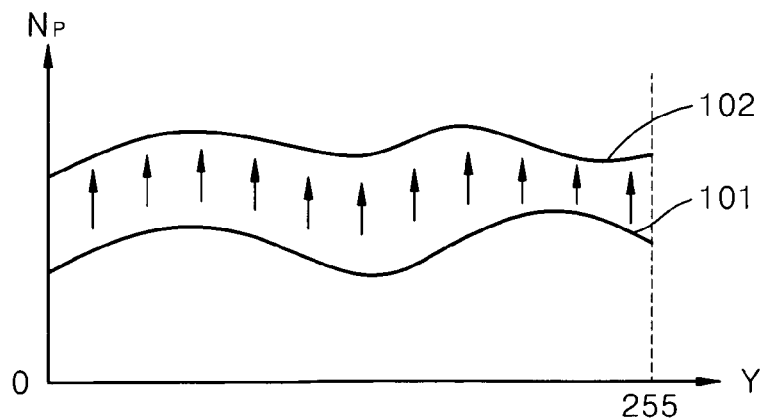
FIG. 10 is an example of a graph of a histogram transition in operation S95 illustrated in FIG. 9 (obtaining a transition of a histogram of a currently detected body image with respect to a histogram of a previously detected body image).

FIG. 9 is a flowchart illustrating an example of a method of the DCP 507 illustrated in FIG. 1 of determining a movement state of a face when a current body is detected after a previous body is detected according to operation S26 illustrated in FIG. 2 (detecting a body having stored mean red, green, and blue gradations), according to another embodiment of the present invention. FIG. 10 is an example of a graph illustrating a histogram transition, in operation S95 of FIG. 9 (obtaining a transition of a histogram of a currently detected body image with respect to a histogram of a previously detected body image).

In FIG. 9, a facial movement state is determined by comparing a luminance histogram of a previously detected body image and a luminance histogram of a currently detected body image.

The method of the DCP 507, which is illustrated in FIG. 9, of determining a movement state of a face when a current body is detected after a previous body is detected will now be described with reference to FIGS. 5, 7, and 10.

The DCP 507 obtains a histogram 101 of a previously detected body image in terms of the number of pixels according to corresponding luminance values, in operation S91.

The DCP 507 obtains a histogram 102 of a currently detected body image in terms of the number of pixels according to corresponding luminance values, in operation S93.

The DCP 507 obtains a histogram transition of the histogram 102 of the currently detected body image with respect to the histogram 101 of the previously detected body image, in operation S95.

The DCP 507 determines a facial movement state according to the histogram transition in operation S97. For example, if the transition histogram is an upward transition, as shown in FIG. 10, it is determined that a face turns from facing left to face away (refer to FIGS. 7 and 8).

According to operations described previously in the foregoing discussion, a current direction of a face can be determined by comparing an image characteristic of a previously detected body and an image characteristic of a currently detected body. Accordingly, even when a face of interest is not oriented to a capturing unit, the face can be quickly detected.

As described previously in the foregoing discussion, according to an example of the present invention, if a face is not detected, a current direction of the face can be determined using an image characteristic of a body. Thus, even when a face to be recognized is not oriented to a capturing unit, the face can be quickly detected.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of controlling a digital image processing apparatus for detecting a face from continuously input images, the method comprising:
   (a) if a face is detected, storing image information of a body area;
   (b) if a face is not detected, detecting a body having image information stored in (a); and (c) if a current body is detected after a previous body was detected in (b), determining a movement state of the face by comparing a luminance characteristic of contours of the previously detected body and a luminance characteristic of contours of the currently detected body by:
(c11) obtaining a contour feature value by adding luminance difference values between adjacent pixels with respect to all contours of the previously detected body;
(c12) obtaining a contour feature value by adding luminance difference values between adjacent pixels with respect to all contours of the currently detected body;
(c13) calculating a rate of contour feature change, which is a rate of change of the contour feature value of the currently detected body with respect to the contour feature value of the previously detected body; and
(c14) determining the movement state of the face according to the rate of contour feature change.

2. The method of claim 1, wherein (a) comprises:
(a1) setting a size and reference coordinates of a body according to a size and reference coordinates of the detected face; and
(a2) storing image information of the body area set in (a1).

3. The method of claim 1, wherein, in (a) and (b), the image information of the body area comprises a mean gradation of the body area.

4. The method of claim 2, wherein the mean gradation of the body area comprises a mean red gradation, a mean green gradation, and a mean blue gradation of the body area.

5. The method of claim 1, wherein, in (c11) and (c12), when pixels of a contour are a second pixel and a third pixel, a luminance difference value between a first pixel and the second pixel, a luminance difference value between the second pixel and the third pixel, and a luminance difference value between the third pixel and a fourth pixel are added with respect to the contour.

6. The method of claim 1, wherein in (c), the movement state of the face is determined by comparing a luminance histogram of the previously detected body image and a luminance histogram of the currently detected body image.

7. The method of claim 6, further comprising:
(c21) obtaining a histogram corresponding to the number of pixels according to corresponding luminance values of the previously detected body image;
(c22) obtaining a histogram corresponding to the number of pixels according to corresponding luminance values of the currently detected body image;
(c23) obtaining a transition of the histogram of the currently detected body image with respect to the histogram of the previously detected body image; and
(c24) determining the movement state of the face according to the histogram transition.

8. A digital image processing apparatus, which comprises a main controller and detects a face from continuously input images, wherein the main controller employs the method of claim 1.

* * * * *